United States Patent
Ngo

(12) 
(10) Patent No.: US 6,450,697 B1
(45) Date of Patent: Sep. 17, 2002

(54) OPTICAL CONNECTOR HAVING A COMBINED GUIDE PIN LOCK AND GROUNDING CONTACT

(75) Inventor: Hung Viet Ngo, Harrisburg, PA (US)

(73) Assignee: Berg Technology, Inc., Reno, NV (US)

( * ) Notice: Subject to any disclaimer, the term of this patent is extended or adjusted under 35 U.S.C. 154(b) by 0 days.

(21) Appl. No.: 09/645,388

(22) Filed: Aug. 24, 2000

(51) Int. Cl.⁷ .............................................. G02B 6/36
(52) U.S. Cl. ......................... 385/78; 385/72; 439/609
(58) Field of Search ..................... 385/78, 72; 439/609, 439/744

(56) References Cited

U.S. PATENT DOCUMENTS

| | | | |
|---|---|---|---|
| 4,818,058 A | | 4/1989 | Bonanni |
| 4,830,456 A | | 5/1989 | Kakii et al. |
| 4,840,451 A | | 6/1989 | Sampson et al. |
| 4,944,568 A | | 7/1990 | Danbach et al. |
| 5,193,641 A | * | 3/1993 | Durrell ....................... 180/287 |
| 5,348,487 A | | 9/1994 | Marazzi et al. ............ 439/138 |
| 5,502,785 A | * | 3/1996 | Wang et al. .................. 385/92 |
| 5,519,798 A | * | 5/1996 | Shahid et al. ................ 385/65 |
| 5,528,408 A | | 6/1996 | McGinley et al. .......... 359/152 |
| 5,561,727 A | | 10/1996 | Akita et al. ................... 385/88 |
| 5,563,972 A | | 10/1996 | Krausse et al. .............. 385/56 |
| 5,633,963 A | * | 5/1997 | Rickenbach et al. ......... 385/25 |
| 5,682,451 A | * | 10/1997 | Lee et al. ...................... 385/78 |
| 5,748,821 A | | 5/1998 | Schempp et al. ............. 385/76 |
| 5,830,124 A | | 11/1998 | Suzuki et al. ............... 600/134 |
| 5,879,173 A | | 3/1999 | Poplawski et al. .......... 438/138 |
| 5,915,058 A | * | 6/1999 | Clairardin et al. ........... 385/77 |
| 5,963,689 A | | 10/1999 | Hesselbom ................... 385/53 |
| 5,971,625 A | * | 10/1999 | Lu ............................... 385/60 |
| 5,980,324 A | | 11/1999 | Berg et al. .................. 439/630 |
| 6,036,544 A | | 3/2000 | Brunker et al. ............. 439/607 |
| 6,106,745 A | * | 8/2000 | Krins et al. ................. 264/1.27 |
| RE37,080 E | * | 3/2001 | Stephenson et al. .......... 385/78 |
| 6,203,336 B1 | * | 3/2001 | Nakamura ................... 439/80 |
| 6,259,856 B1 | * | 7/2001 | Shahid ....................... 385/147 |

FOREIGN PATENT DOCUMENTS

| | | |
|---|---|---|
| DE | 3227770 A1 | 1/1984 |
| DE | 19539549 C1 | 12/1996 |
| EP | 0497463 A2 | 8/1992 |
| EP | 0753774 A2 | 1/1997 |
| EP | 0 927 899 A1 | 7/1999 |
| EP | 0 949 522 A2 | 10/1999 |

OTHER PUBLICATIONS

European Search Report dated Oct. 29, 2001, 2 pages.

* cited by examiner

Primary Examiner—Brian Sircus
Assistant Examiner—Hae Moon Hyeon
(74) Attorney, Agent, or Firm—Harrington & Smith, LLP

(57) ABSTRACT

An optical connector comprising a housing; a shield member located in the housing; a ferrule and optical member assembly located, at least partially, in the housing; at least one locating pin connected to the ferrule and optical member assembly; and at least one combined pin lock and grounding member. The locating pin extends from a front end of the ferrule and optical member assembly. The combined pin lock and grounding member connects the locating pin to the housing and is adapted to electrically connect a mating member, in which the optical connector is inserted, to the shield member.

24 Claims, 3 Drawing Sheets

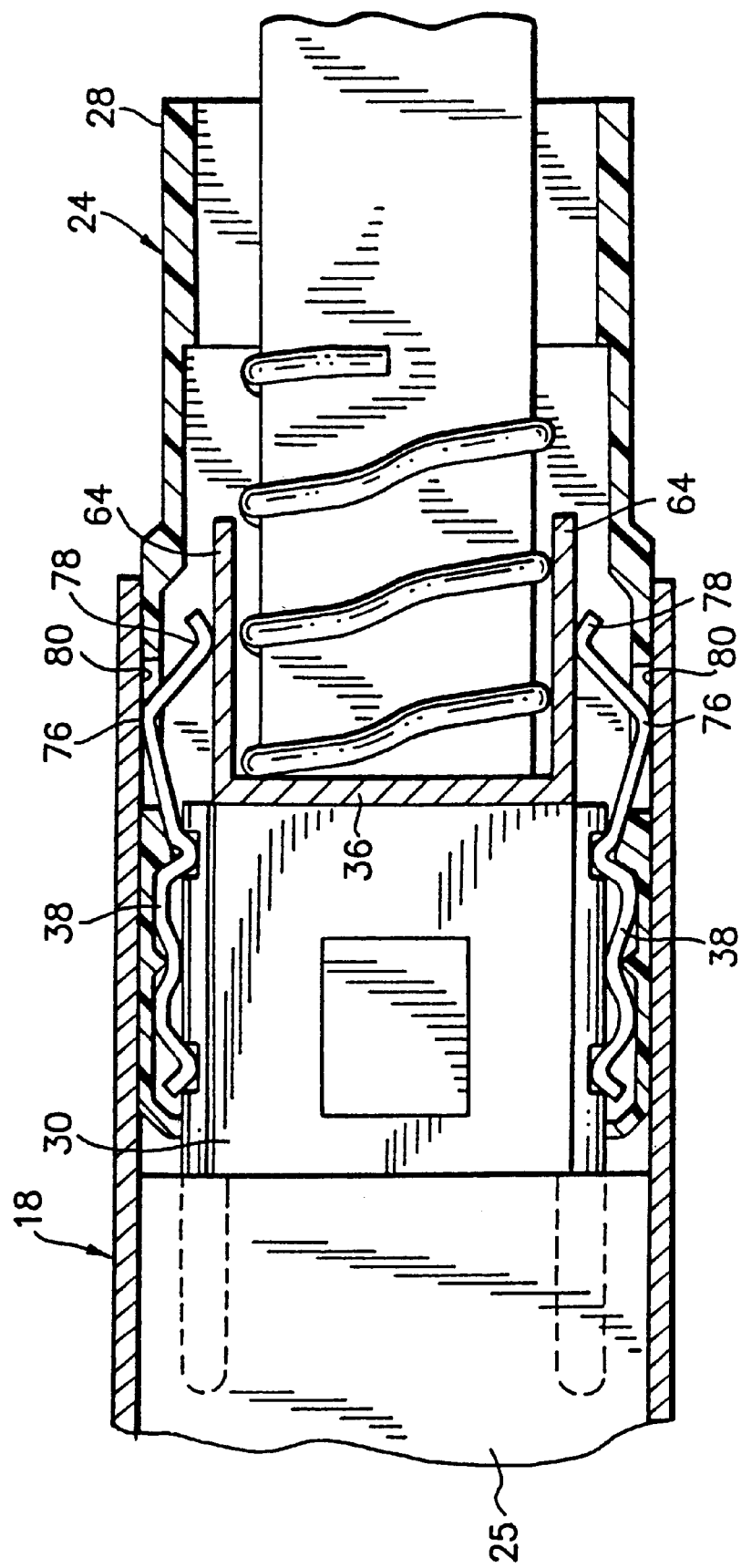

OPTICAL CONNECTOR HAVING A COMBINED GUIDE PIN LOCK AND GROUNDING CONTACT

BACKGROUND OF THE INVENTION

1. Field of the Invention

The present invention relates to optical connectors and, more particularly, to an optical connector having a guide pin and shielding.

2. Brief Description of Earlier Developments

U.S. Pat. No. 4,840,451 discloses a shielded fiber optic connector assembly. European Patent Office patent application No. 0927899 discloses a fiber optic connector inserted into a metal shell of an adapter assembly. U.S. Pat. No. 4,818,058 discloses an optical connector having guide rods held against Silicon blocks by a spring clip. Electrical devices exist that generate electromagnetic interference (EMI). These devices are shielded to substantially prevent EMI from exiting the device and causing interference with other electrical devices. Some electrical devices are connected by optical conductors to other electrical devices, such as a computer terminal connected to a computer network by an optical cable and connector assembly. A problem exists with connection of conventional optical connectors to conventional electrical devices in that an aperture is provided in the electrical device for receiving the optical connector which results in an aperture in the electrical device's shield. This can allow EMI to escape through the optical connector aperture in the shield. There is a need to allow optical connectors to be connected to electrical devices, but without also causing a substantial EMI shield breach. This can be especially desirable for a network router having multiple optical connector sockets; such as ten or twenty.

SUMMARY OF THE INVENTION

In accordance with one embodiment of the present invention, an optical connector is provided comprising a housing, a shield member located in the housing, a ferrule and optical member assembly located, at least partially, in the housing, at least one locating pin connected to the ferrule and optical member assembly, and at least one combined pin lock and grounding contact member. The locating pin extends from a front end of the ferrule and optical member assembly. The combined pin lock and grounding contact member connects the locating pin to the housing and is adapted to electrically connect a mating member, in which the optical connector is inserted, to the shield member.

In accordance with another embodiment of the present invention, an optical connector is provided comprising a housing, a shield member slidingly mounted in the housing, a ferrule and optical member assembly movably mounted in the housing, and a grounding contact connected to the housing. The grounding contact is adapted to connect the shield member to a mating member in which the optical connector is intended to be inserted.

In accordance with another embodiment of the present invention, an optical connector is provided comprising a housing, a ferrule and optical member assembly movably mounted in the housing, a shield member movably mounted to the housing and contacting the ferrule and optical member assembly, and a spring located in the housing and biasing the shield member against the ferrule and optical member assembly.

BRIEF DESCRIPTION OF THE DRAWINGS

The foregoing aspects and other features of the present invention are explained in the following description, taken in connection with the accompanying drawings, wherein:

FIG. 3 is a partial schematic cross-sectional view of the optical connector and mating member shown in FIG. 2 connected to each other.

DETAILED DESCRIPTION OF THE PREFERRED EMBODIMENT

Figure 1:
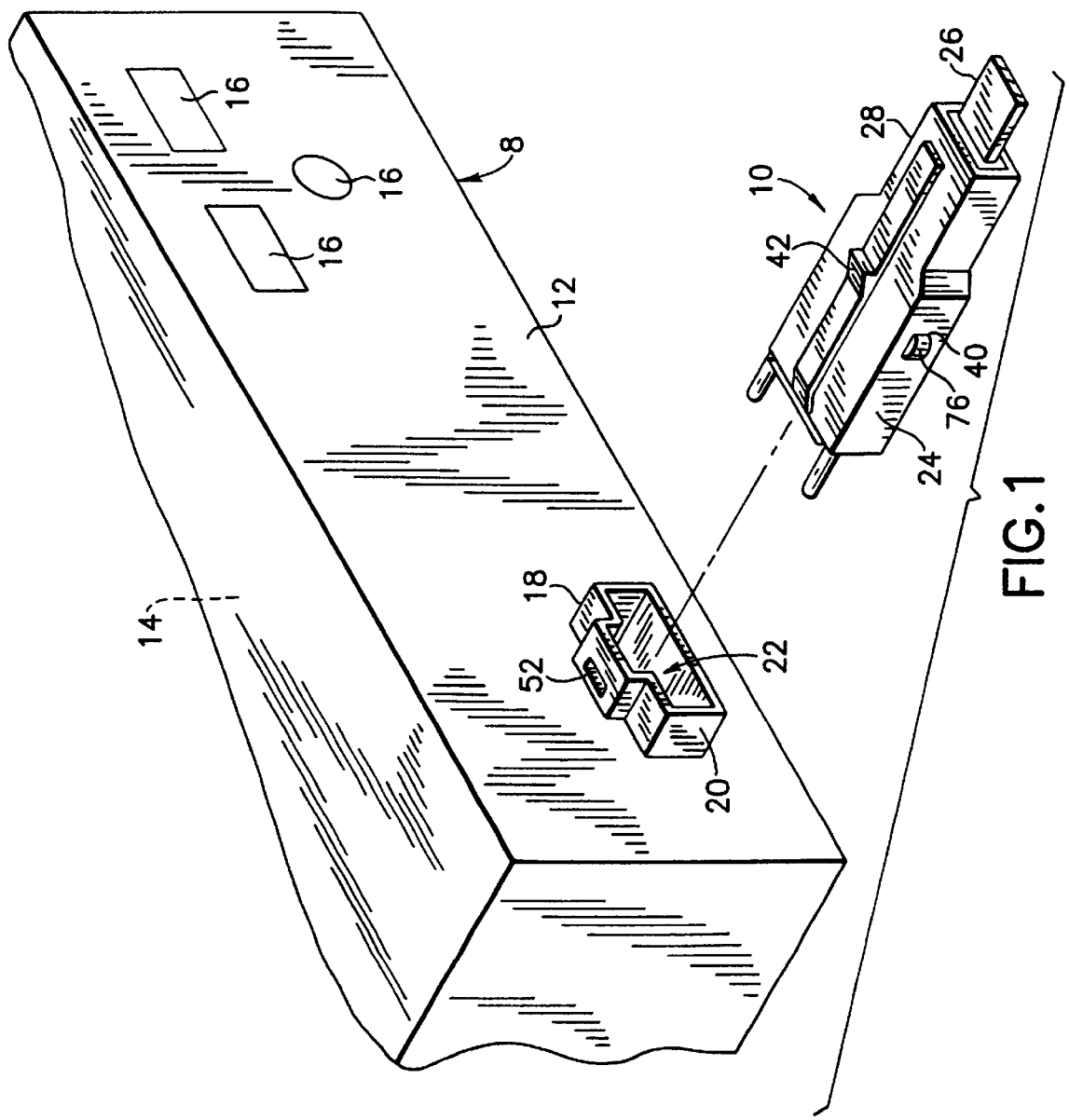
FIG. 1 is a partial perspective view of an electrical and optical component and an optical connector incorporating features of the present invention.

Referring to FIG. 1, there is shown a perspective view of an electrical device and an optical conductor assembly 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

The electrical device 8 can be any suitable type of device, such as a computer, network router or telephone. The electrical device 8 includes a housing 12, electronic components 14 inside the housing, electrical connectors 16, and an optical connector socket 18. The housing 12 is preferably metal and forms a shield for the electronic components 14. However, any suitable housing and shielding could be provided. The optical connector socket 18 preferably comprises a shield member 20 which is electrically connected to the housing 12 to form part of the shield. However, an aperture 22 exists in the shield at the socket 18; the aperture 22 being needed to receive a plug connector 24 of the optical conductor assembly 10.

Figure 2:
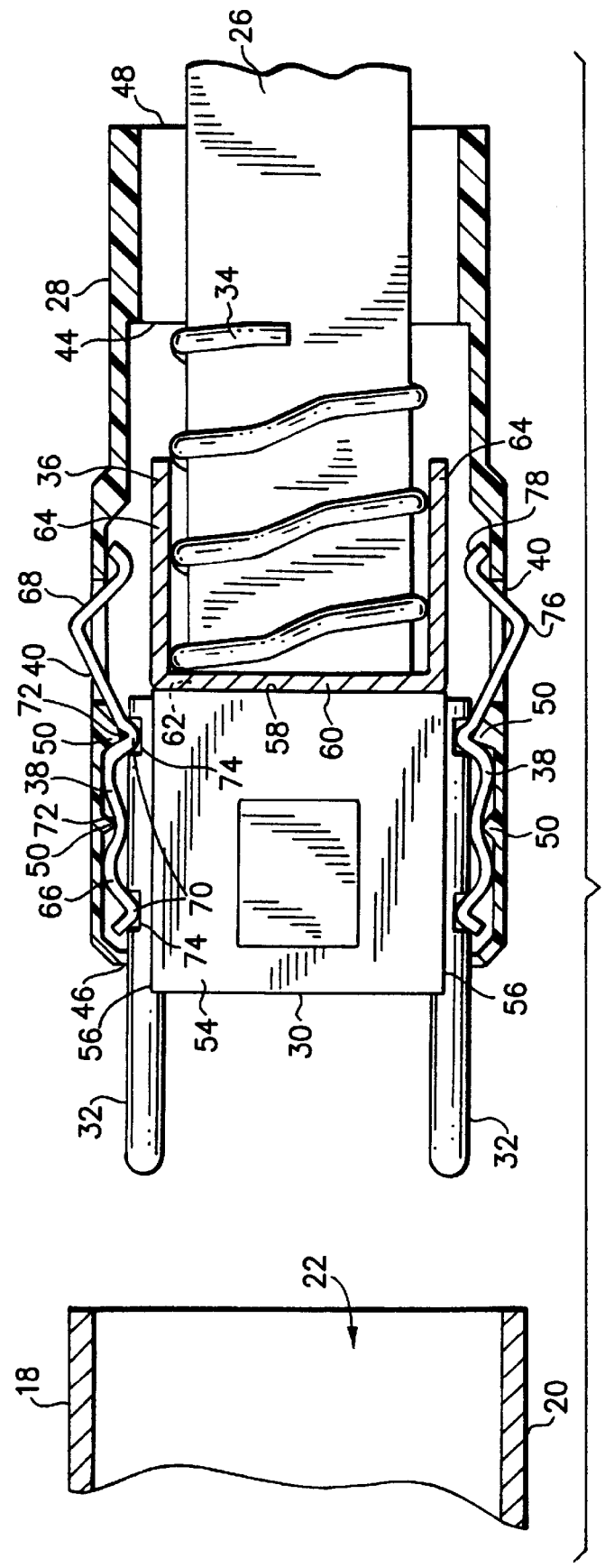
FIG. 2 is a partial schematic cross-sectional view of the optical connector shown in FIG. 1 about to be connected to a mating member.

The optical conductor assembly 10 generally comprises an optical conductor cable 26 and the optical conductor connector 24. The optical conductor cable 26 preferably comprises a plurality of optical conductors (not shown), such as optical fibers surrounded by a protective cover. However, any suitable optical conductor cable 26 could be used. Referring also to FIG. 2, the optical conductor connector 24 generally comprises a housing 28, an optical conductor cable 26 and ferrule subassembly 30, guide pins 32, a spring 34, a shield 36, and spring members 38. The housing 28 is preferably comprised of plastic and comprises lateral side windows 40, a latch 42 (see FIG. 1), a spring support ledge 44, substantially open front and rear ends 46, 48 and spring member supports 50. The latch 42 is adapted to engage the latch 52 at the socket 18. However, any suitable latching arrangement could be provided. The subassembly 30 preferably comprises portions of the optical conductors of the cable 26, with its cover removed, and a ferrule 54. Ferrule 54 preferably comprises Silicon chips locating the optical conductor portions at fixed positions. The subassembly 30 is preferably fixedly assembled by suitable means, such as epoxy. Lateral sides 56 of the ferrule 54 form guide pin receiving areas. The cable 26 extends out of the rear end 58 of the ferrule. However, in alternate embodiments any suitable optical conductor and ferrule subassembly could be provided. In this embodiment the subassembly 30 is movably mounted to the housing 28 to be able to slide relative to the housing 28. However, the subassembly 30 need not be movably mounted to the housing or any suitable movement could be provided.

The shield 36 is preferably located against the rear end 58 of the ferrule 54. The shield 36 has EMI shielding properties.

In this embodiment the shield 36 is comprised of metal and has a general "U" shape. However, in alternate embodiments the shield could have any suitable shape and be comprised of any suitable material(s). The shield 36 has a front planar section 60 which includes an aperture or slit 62. The slit 62 is preferably about the same cross-sectional size and shape as the cable 26. The cable 26 extends through the slit 62. The spring 34 surrounds a portion of the cable 26 and is located between the spring ledge 44 and the center section 60 of the shield 36. The spring 34 biases the shield 36 in a forward direction. Because the shield 36 is located against the rear end 58 of the ferrule 54, the subassembly 30 is, thus, biased by the spring in a forward direction. The shield 36 can slide rearward relative to the housing 28 if the subassembly 30 is pushed rearward. Sides 64 of the shield extend along the outside of the spring 34 and part of the cable 26, and are located proximate interior surfaces of lateral sides of the housing 28.

The spring members 38 are preferably comprised of electrically conductive material, such as metal. The spring members 38 can perform two functions. First, the spring members 38 can function as a lock or fastener for fixedly attaching the guide pins 32 to the housing 28 and against the ferrule 54. Second, the spring members 38 can function as grounding contacts and shields. This second function will be described in greater detail below. Thus, each of the spring members 38 form a combined pin lock and grounding contact member. In alternate embodiments, more of less than two spring members 38 could be used. The spring members 38 could also perform more or less than two functions. Each member 38 comprises a locking section 66 and a resiliently deflectable section 68. In alternate embodiments the spring members 38 could have any suitable shape.

The locking section 66 comprises two projections 70 and recesses 72. The projections 70 extend into recesses 74 in the guide pins 32. The member supports 50 of the housing 28 extend into the recesses 72 of the spring members 38 during insertion of the spring members 38 into the housing 28 to prevent further movement of the locking section 66 relative to the housing 28. Once spring members 38 are inserted into housing 28, the pins 32 are inserted. The location of the projections 70 into guide pin recesses 74 stationarily fixes the guide pins 32 to the housing 28. The locking section 66 also biases the guide pins 32 against the lateral sides 56 of the ferrule 54 into the guide pin receiving areas as the ferrule is inserted into the housing 28. However, the ferrule 54 can slide along the guide pins 32. The deflectable section 68 includes a first portion 76 and a second portion 78. The first portion 76 extends out of the housing 28 at one of the side windows 40. The second portion 78 is adapted to contact the shield 36 when the first portion 76 is pushed into the window 40.

Referring also to FIG. 3, the connector 24 is shown inserted into the socket 18. When the connector 24 is inserted, it connects to a mating connector 25 connected to the socket 18. The socket 18 could be part of the mating connector 25. As the connector 24 is inserted into the socket 18, the first portions 76 of the deflectable sections 68 contact the socket 18 and are deflected inward back into the windows 40. The first portions 76 subsequently rest against the interior surface 80 of the socket 18 and make electrical contact thereat. When the first portions 76 are deflected inward, the second portions 78 are moved into contact with the sides 64 of the shield 36. Thus, an electrical connection is established between the shield 36 and the socket 18 through the spring members 38. As noted above, the subassembly 30 and the shield 36 are preferably slidably mounted to the housing 28. The connection of the second portion 78 against the sides 64 of the shield 36 allows the shield 36 to slide along the second portion 78 while still maintaining electrical connection between the spring members 38 and the shield 36.

With the present invention, the optical connector 24 is able to close a substantial portion of the gap in the shielding of the electronic device 8 at the aperture 22. The shield 36 and spring members 38 cooperate with the socket 18 to form a shield at a majority of the aperture 22 when the connector 24 is inserted into the socket 18. This is accomplished while still allowing the subassembly 30 to be movably mounted to the housing 28. In addition, the spring members 38 can be configured to perform multiple functions as an electrical contact/shield, and as retainers to connect the guide pins to the housing and bias the guide pins against the ferrule 54. This can result in a reduction of manufacturing costs for the optical connector.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An optical connector comprising:
    a housing;
    a shield member located in the housing;
    a ferrule and optical conductor cable assembly located, at least partially, in the housing;
    at least one locating pin connected to the ferrule and optical conductor cable assembly, the at least one locating pin extending from a front end of the ferrule and optical conductor cable assembly; and
    at least one combined pin lock and grounding member, the combined lock and grounding member connecting the locating pin to the housing and being adapted to electrically connect a mating member, in which the optical connector is inserted, to the shield member.

2. An optical connector as in claim 1 wherein the connector comprises two of the locating pins located on opposite sides of the ferrule and optical conductor cable assembly and two of the combined lock and grounding members connected to respective ones of the locating pins.

3. An optical connector as in claim 1 wherein the locating pin comprises at least one recess and the combined lock and grounding member comprises at least one projection which extends into the recess.

4. An optical connector as in claim 3 wherein the locating pin comprises two of the recesses and the combined lock and grounding member comprises at least two of the projections which extend into respective ones of the recesses.

5. An optical connector as in claim 3 wherein the combined lock and grounding member comprises a resiliently deflectable section having a first portion extending out of the housing for contacting the mating member.

6. An optical connector as in claim 5 wherein the resiliently deflectable section comprises a second portion adapted to contact the shield member when the first portion is deflected into the housing by the mating member.

7. An optical connector as in claim 6 wherein the shield member is slidable in the housing and slidable relative to the second portion of the combined lock and grounding member.

8. An optical connector as in claim 1 further comprising a spring biasing the ferrule and optical conductor cable assembly in a forward position on the housing.

9. An optical connector as in claim 8 wherein the shield member is biased by the spring against the ferrule and optical conductor cable assembly.

10. An optical connector as in claim 1 wherein the shield member comprises a center section with a through-hole which the optical conductor cable of the ferrule and optical conductor cable assembly passes through.

11. An optical connector as in claim 10 wherein the shield member comprises a side section extending from the center section which is slidable generally parallel to the combined lock and contact member.

12. An optical connector comprising:

a housing;

a shield member movably mounted in the housing;

a ferrule and optical conductor cable assembly movably mounted in the housing; and a grounding contact connected to the housing and adapted to electrically connect the shield member to a mating member in which the optical connector is intended to be inserted.

13. An optical connector as in claim 12 further comprising a spring biasing the shield member and the ferrule and optical conductor cable assembly at a forward position on the housing.

14. An optical connector as in claim 13 wherein the shield member comprises a leading substantially planar section located against a rear end of a ferrule of the ferrule and optical conductor cable assembly.

15. An optical connector as in claim 14 wherein the shield member comprises a through-hole in the planar section, and an optical cable of the ferrule and optical conductor cable assembly extends through the through-hole.

16. An optical connector as in claim 12 wherein the shield member comprises a substantially planar center section behind a ferrule of the ferrule and optical conductor cable assembly, and a side section adapted to be contacted by the grounding contact and slide along the grounding contact.

17. An optical connector as in claim 12 further comprising at least one locating pin stationarily connected to the housing by the grounding contact.

18. An optical connector as in claim 17 wherein the connector comprises two of the locating pins located against opposite sides of the ferrule and optical conductor cable assembly and two of the grounding contacts, each grounding contact being connected to a respective one of the locating pins.

19. An optical connector comprising:

a housing;

a ferrule and optical conductor cable assembly movably mounted in the housing;

a shield member movably mounted in the housing and contacting the ferrule and optical conductor cable assembly; and a spring located in the housing and biasing the shield member against the ferrule and optical member assembly.

20. An optical connector as in claim 19 wherein the shield member comprises a through-hole slit, and an optical cable of the ferrule and optical conductor cable assembly extends through the through-hole slit.

21. An optical connector as in claim 19 wherein the shield member comprises a substantially planar center section behind a ferrule of the ferrule and optical conductor cable assembly, and a side section extending along an outside portion of the spring.

22. An optical connector as in claim 19 further comprising at least one grounding contact connected to the housing, the grounding contact being connectable to the shield member and extending along a side of a ferrule of the ferrule and optical conductor cable assembly, a locating pin receiving area being formed between the side of the ferrule and the grounding contact.

23. An optical connector as in claim 22 further comprising at least one locating pin located in the pin receiving area, the locating pin being stationarily connected to the housing by the grounding contact.

24. An optical connector as in claim 22 wherein the shield member is slidable along the grounding contact.

* * * * *